UNITED STATES PATENT OFFICE.

STEPHEN P. SOLLAWAY, OF WILMINGTON, DELAWARE.

WATERPROOFING COMPOSITION AND PROCESS OF MAKING AND USING SAME.

1,339,724.                Specification of Letters Patent.    Patented May 11, 1920.

No Drawing.          Application filed April 10, 1919.   Serial No. 289,076.

*To all whom it may concern:*

Be it known that I, STEPHEN P. SOLLAWAY, a citizen of the United States, residing at Wilmington, in the county of New Castle and State of Delaware, have invented certain new and useful Improvements in Waterproofing Composition and Processes of Making and Using Same, of which the following is a specification.

My invention relates to the art of waterproofing and has for its object the provision of a waterproofing composition, the method of making it, and a method of water proofing.

This composition, while adapted for ordinary waterproofing by coating or impregnating, has special advantages since it can be used for the efficient waterproofing of articles made of fiber, vulcanized fiber, etc., the waterproofing of which heretofore has been impracticable by reason of the close texture and liquid repelling properties thereof, but which can be accomplished successfully and efficiently with my composition, owing to the fact that my composition as hereinafter described opens the pores of the surface to be coated, loosens the fibers without destroying the same and removes the liquid-repelling ingredients present in the surface to be coated.

I combine with a waterproofing material an acid vehicle having pore opening and fiber loosening properties, but not destructive to the fiber due to which the waterproofing material adheres to the surface of the fiber more readily.

My improved composition may be made as follows. Coal pitch is dissolved or mixed with enough oil of sassafras to make a paint, then with this liquid pitch paint is mixed enough litharge to give a good base or drying quality, that is, about 16 parts of litharge to one part of paint. With this are mixed equal parts of carbolic and muriatic acids, the quantity sufficient to turn the paint and litharge into a thick paste, the said acids acting as the penetrating vehicle above referred to. With this paste is then mixed linseed oil and shellac in the proportions of two parts shellac and one of oil.

The composition is now ready for use.

In making my waterproofing composition, depending on conditions present, I may use oil of cloves instead of oil of sassafras, and I may substitute carbolic and muriatic acids ore for another, and I may use red lead wit' the litharge.

In making up my composition heating is advantageous, as it causes the ingredients to mix more readily.

The fiber to be waterproofed is soaked in my improved composition until it is sufficiently saturated. The fiber may then be subjected to slight heating, which drives off the more volatile constituents, leaving the waterproofing in the fiber.

Should I desire a finishing coating on the impregnated fiber I may use a composition comprising lead drier, linseed oil, pitch and shellac.

If desired a coloring pigment may be added to either the impregnating or the coating composition.

This application is a continuation in part of my application Serial No. 260,627, filed November 1, 1918.

I claim:

1. A waterproofing composition comprising a waterproofing material, and muriatic and carbolic acids incorporated therewith.

2. A waterproofing composition comprising a mixture of a substantially non-volatile coating material, with lead oxid, and muriatic and carbolic acids.

3. A waterproofing composition comprising pitch, an essential oil, lead oxid, linseed oil and shellac, and a fiber-loosening and pore-opening acid material not destructive to the fiber.

4. A waterproofing composition comprising a mixture of a substantially non-volatile painting and coating material with a heavy metal thickening and drying compound and muriatic acid.

5. The process of making a waterproofing composition which consists in mixing coal pitch with sufficient essential oil to make a paint, mixing therewith about 16 parts of lead oxid, mixing therewith sufficient fiber-loosening and pore-opening acid material non-destructive to the fiber to make the whole a thick paste, and thereupon mixing therewith linseed oil and shellac in the proportion of two parts of shellac and one of oil.

6. The process of waterproofing difficultly permeable fiber which consists in treating a mixture of a waterproofing material with an acid fiber-loosening and pore-opening material undestructive of the fiber and causing the mixture to act upon said fiber.

7. The process of waterproofing which consists in impregnating fiber with a composition comprising waterproofing base, a solvent therefor, and muriatic and carbolic acids, and then warming.

8. The process of waterproofing vulcanized fiber which consists in impregnating it with a composition consisting of pitch, an essential oil, lead oxid, muriatic acid, linseed oil and shellac.

9. The process of waterproofing vulcanized fiber which consists in impregnating it with a composition consisting of pitch, an essential oil, lead oxid, muriatic acid, linseed oil and shellac, and then warming.

In testimony whereof I affix my signature.

STEPHEN P. SOLLAWAY.